F. H. PATTERSON.
LAWN MOWER SHARPENER.
APPLICATION FILED NOV. 27, 1914.
1,163,950.
Patented Dec. 14, 1915.
2 SHEETS—SHEET 2.
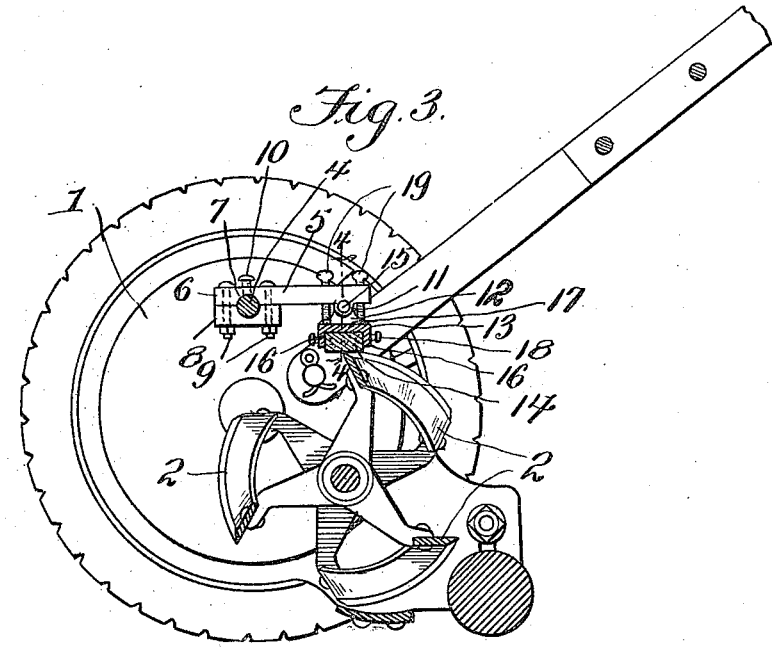
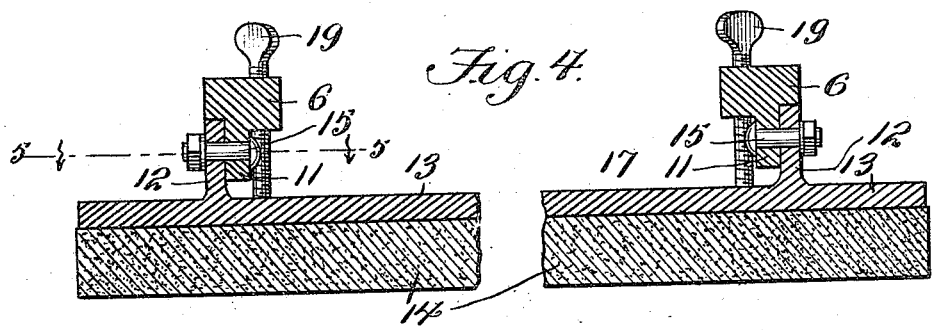
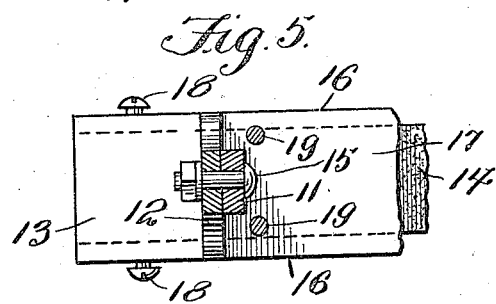
Inventor
F. H. Patterson
Witnesses
By Victor J. Evans
Attorney

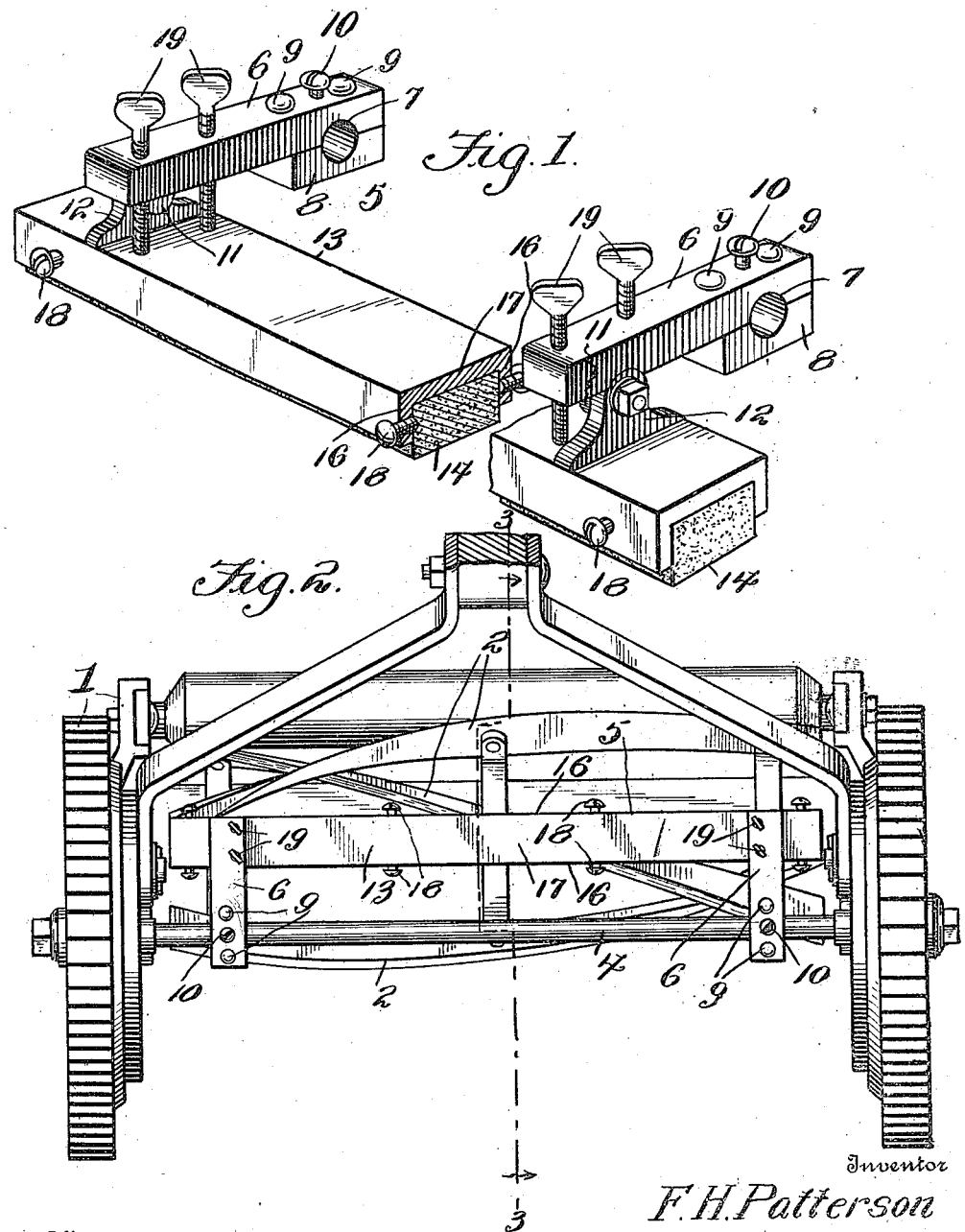

UNITED STATES PATENT OFFICE.

FRANK H. PATTERSON, OF CLAYTON, NEW YORK.

LAWN-MOWER SHARPENER.

1,163,950.

Specification of Letters Patent. Patented Dec. 14, 1915.

Application filed November 27, 1914. Serial No. 874,303.

*To all whom it may concern:*

Be it known that I, FRANK H. PATTERSON, a citizen of the United States, residing at Clayton, in the county of Jefferson and State of New York, have invented new and useful Improvements in Lawn-Mower Sharpeners, of which the following is a specification.

This invention relates to attachments for lawn mowers adapted for sharpening the knives or blades thereof; and the object of the invention is to simplify and render effective devices of this character and to provide a sharpening device which may be accurately adjusted to sharpen the rotary knives or blades at any desired bevel and to afford facilities for the proper and expeditious manner of attaching the device and of positioning the emery bar, file, oil stone or other sharpening device with relation to the knives or blades so that the latter may have their cutting edges sharpened.

Another object of the invention is to provide a device of this class which may be easily and quickly attached to the connecting bar of any ordinary lawn mower and remain a part of the mower if desired, to provide the sharpening member with means whereby the same may be adjusted to contact with the blades of the mower or to be brought out of said contact as desired.

A still further object of the invention is to provide a simple, cheap and effective device of this class which will sharpen the blades of a mower when the same are rotated by the rotation of the mower, as in mowing.

With the above and other objects in view, the improvement resides in the construction, combination and arrangement of parts set forth in the following specification and falling within the scope of the appended claim.

In the drawings: Figure 1 is a perspective view of my improvement. Fig. 2 is a view illustrating the same attached upon a mower. Fig. 3 is a transverse sectional view approximately on the line 3—3 of Fig. 2. Fig. 4 is a longitudinal sectional view on the line 4—4 of Fig. 3, and Fig. 5 is a horizontal sectional view on the line 5—5 of Fig. 4.

Referring now to the drawings in detail, the numeral 1 designates an ordinary lawn mower provided with the usual cutting blades 2 and having the ordinary connecting bar 4 which is arranged between the disks upon the inner faces of the wheels of the mower.

My improvement is designated generally by the numeral 5 and includes a pair of spaced arms 6, each of said arms having alining semi-cylindrical bearings 7 upon what I will term the underfaces of the said arms, the said bearings being disposed adjacent the opposite ends of the arms. Bearings blocks 8 also provided with semi-cylindrical openings, which are adapted to register with the bearing openings provided in the arms 7, are arranged upon the underfaces of the arms, and are secured thereto by removable elements, such as screws 9, and these bearings are adapted to receive the connecting bar 4, an adjusting thumb screw passing through each of the arms and entering the bearing 7 and contacting with the block to sustain the arms in a desired position upon the said member 4, the said adjusting or binding members being indicated by the numerals 10. The blocks, upon their under faces and adjacent their ends opposite that provided with the bearings are formed with downturned lugs or ears 11, the same contacting with ears 12 provided upon the upper face of the housing 13 for the sharpening element 14. Pivots 15 pass through the ears 11 and 12 so that the housing is hingedly connected to the arms. The housing preferably comprises a substantially rectangular member, which includes longitudinal sides 16 and an upper or connecting member 17, the ends of the said housing being open. The sides 16 are provided at intervals with set screws 18, so that the sharpening member may be adjusted with relation to the housing. Passing through threaded openings in the arms 6 to the opposite sides of the ears 11 are adjusting members 19, preferably in the nature of thumb screws which arrangement permits of the housing being swung with relation to the arms and sustained in such position, so that the sharpening element 14 may be properly adjusted with relation to the blades of the mower upon which the said element operates.

By providing the housing 13 with the open ends and the adjusting or set screws 18 it will be noted that a sharpening element of any desired length may be sustained within the housing, so that the device may be secured upon any make or size of mower and effectively sharpen blades of various lengths.

When the device is properly adjusted upon the mower, the blades of the same will be sharpened while the mower is in operation as will readily be understood.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

In a lawn mower sharpener of laterally extending arms journaled upon a bar of the lawn mower, adjusting members associated with the arms and binding upon the bar for retaining the said arms at an angle with relation to the bar, downturned ears upon the arms adjacent the outer ends thereof, a housing, said housing comprising a top member having downturned side flanges, ears upon the top, a pivotal connection between these ears and the ears of the arms, adjusting elements upon the arms arranged to the opposite sides of the ears and con tacting with the hub, a sharpening element in the housing, and a set screw passing through the flanges in the housing and contacting with the sharpening element to retain the same in the hub.

In testimony whereof I affix my signature in presence of two witnesses.

FRANK H. PATTERSON.

Witnesses:
 WILLIAM H. HOWE.
 MELVIN A. MARBLE.